US009016319B2

(12) United States Patent
Spahr

(10) Patent No.: US 9,016,319 B2
(45) Date of Patent: Apr. 28, 2015

(54) RELIEF VALVES FOR FUEL CELL SYSTEMS

(75) Inventor: Paul Spahr, Durham, CT (US)

(73) Assignees: Societe Bic, Clichy Cedex (FR); The Commissariat a l'Energie Atomique et aux Energies Alternatives (CEA), Gif-sur-Yvette Cedex (FR)

( * ) Notice: Subject to any disclaimer, the term of this patent is extended or adjusted under 35 U.S.C. 154(b) by 863 days.

(21) Appl. No.: 12/912,368

(22) Filed: Oct. 26, 2010

(65) Prior Publication Data
US 2011/0036433 A1    Feb. 17, 2011

Related U.S. Application Data

(63) Continuation-in-part of application No. 12/674,205, filed as application No. PCT/US2008/073868 on Aug. 21, 2008, now Pat. No. 8,561,965.

(60) Provisional application No. 60/957,362, filed on Aug. 22, 2007, provisional application No. 61/016,508, filed on Dec. 24, 2007.

(51) Int. Cl.
*F16K 15/16*    (2006.01)
*F16K 15/14*    (2006.01)
*F16K 17/26*    (2006.01)
*H01M 8/04*    (2006.01)

(52) U.S. Cl.
CPC ............. *F16K 15/144* (2013.01); *F16K 15/148* (2013.01); *F16K 17/26* (2013.01); *H01M 8/04201* (2013.01); *Y02E 60/523* (2013.01)

(58) Field of Classification Search
USPC ............ 251/149.1, 149.8; 137/855, 851, 852, 137/857
See application file for complete search history.

(56) References Cited

U.S. PATENT DOCUMENTS

| 2,449,573 | A | * | 9/1948 | White | 137/218 |
| 2,743,737 | A | | 5/1956 | Textor | |
| 3,040,776 | A | | 6/1962 | Russell | |
| 3,207,171 | A | | 9/1965 | Kryman | |
| 3,807,444 | A | * | 4/1974 | Fortune | 137/512.1 |
| 3,831,628 | A | * | 8/1974 | Kintner et al. | 137/512.15 |
| 4,080,981 | A | | 3/1978 | Stewart | |
| 4,135,803 | A | * | 1/1979 | Van Houwelingen | 396/574 |
| 4,318,809 | A | * | 3/1982 | Bethel | 210/117 |
| 4,538,508 | A | * | 9/1985 | Ballard | 454/361 |
| 4,658,852 | A | | 4/1987 | Weingarten | |

(Continued)

OTHER PUBLICATIONS

International Search Report and Written Opinion issued in connection with the corresponding International Application No. PCT/US2011/057487 on Mar. 14, 2012.

*Primary Examiner* — John K Fristoe, Jr.
*Assistant Examiner* — Andrew J Rost
(74) *Attorney, Agent, or Firm* — The H.T. Than Law Group

(57) ABSTRACT

A compact, reliable, and easily manufacture relief valve capable of resolving pressure issues within a fuel cell system and its components or devices. The relief valve comprises a valve body having a first cap, a valve housing and a center post; and an elastomeric member or sealing member contained within the valve body and being secured to the valve body at one end and forming a seal with the valve body at the other end. The seal opens in response to a threshold pressure being exceeded. In one embodiment, the elastomeric member is secured to the interior of the first cap and/or valve housing and forms a seal with the outer diameter of the center post. The elastomeric member may be supported by a reinforcing member.

30 Claims, 10 Drawing Sheets

(56) References Cited

U.S. PATENT DOCUMENTS

| | | | |
|---|---|---|---|
| 4,696,319 A | | 9/1987 | Gant |
| 4,749,003 A | * | 6/1988 | Leason .................. 137/854 |
| 5,578,059 A | * | 11/1996 | Patzer .................. 251/149.1 |
| 6,149,129 A | * | 11/2000 | Harris et al. ............ 251/149.1 |
| 6,651,955 B2 | * | 11/2003 | Anderson .................. 251/149.1 |
| 8,196,894 B2 | | 6/2012 | Spahr et al. |
| 2005/0158188 A1 | | 7/2005 | Matsui et al. |
| 2011/0120220 A1 | | 5/2011 | Curello et al. |
| 2011/0189574 A1 | | 8/2011 | Curello et al. |

\* cited by examiner

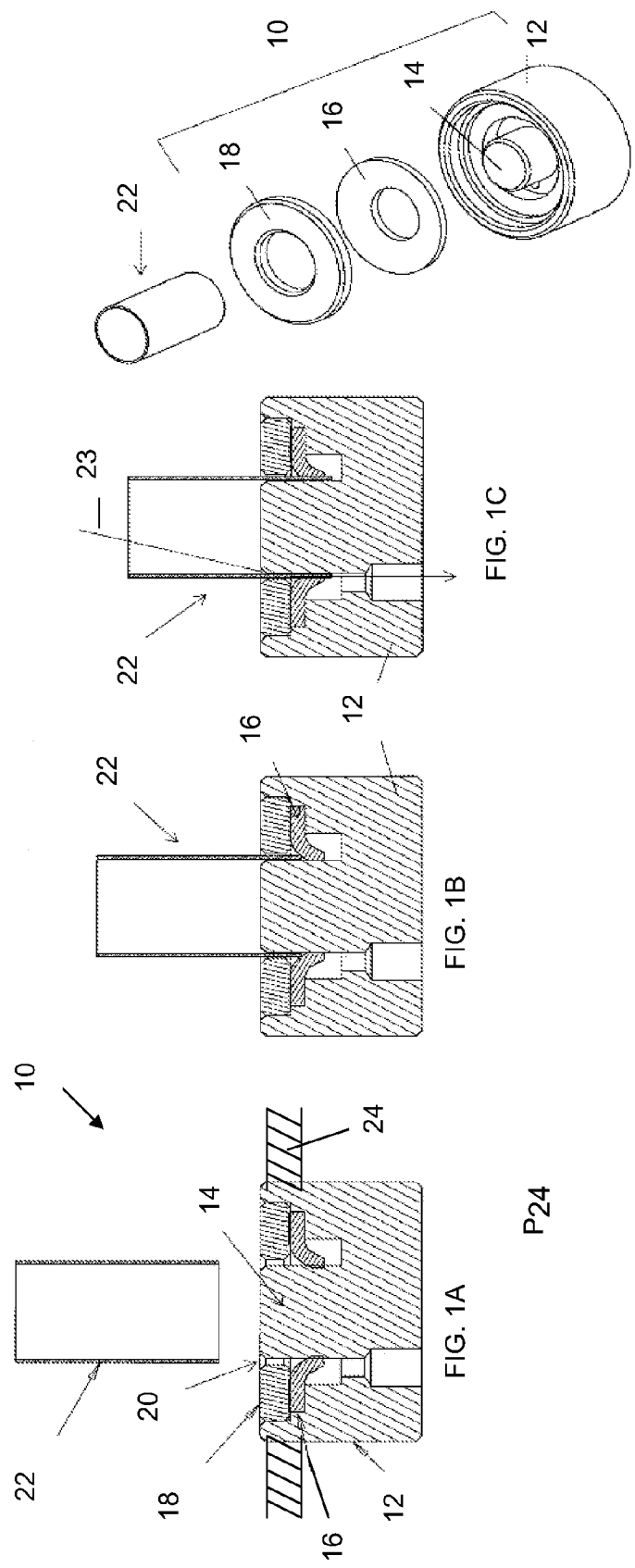

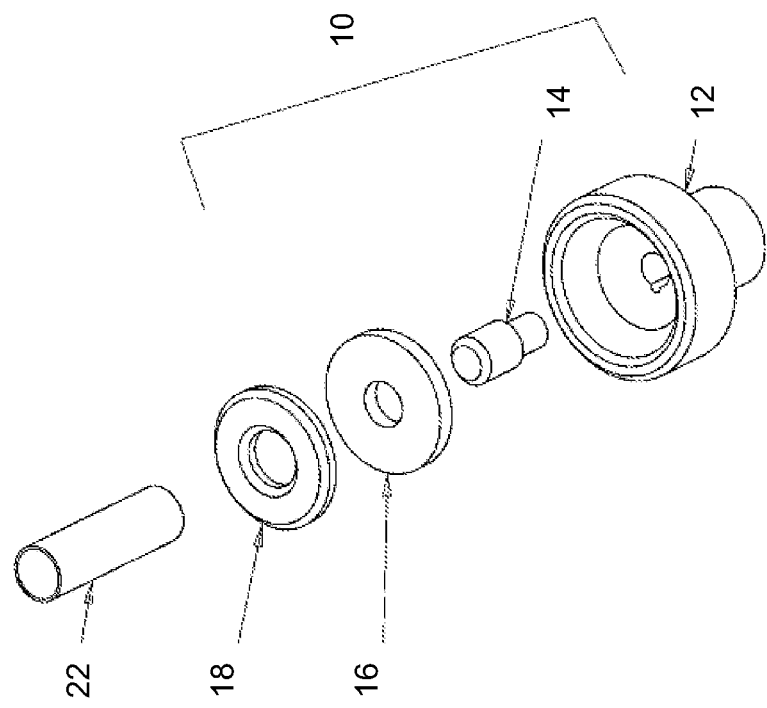
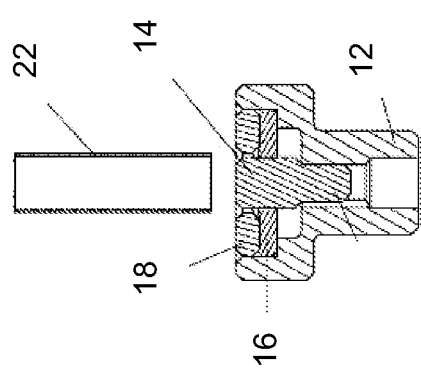

RELIEF VALVES FOR FUEL CELL SYSTEMS

CROSS REFERENCE TO RELATED PATENT APPLICATION

The present patent application is a continuation-in-part of U.S. patent application Ser. No. 12/674,205 filed on 19 Feb. 2010, entitled "Non-interchangeable Connecting Valves for Fuel Cartridge," which claims priority to international patent application Ser. No. PCT/US2008/073868 filed on 21 Aug. 2008 designating the United States under 35 U.S.C. §371 which claims priority to U.S. provisional applications 60/957,362 filed on 22 Aug. 2007 and Ser. No. 61/016,508 filed on 24 Dec. 2007. These applications are incorporated herein by reference in their entirety.

FIELD OF THE INVENTION

This invention generally relates to a reliable relief valve. In particular, this valve may be useful in various fuel cell systems, including, but not limited to, fuel cartridges, fuel cells, and fuel refilling devices and in other fuel or fluid storage systems. More particularly, this invention relates to a valve comprising a valve body and a sealing member that form a seal which opens to relieve a pressure differential to release gases, liquids, and/or vapors when the pressure builds within the device and/or to take in air to relieve a vacuum within the device.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuels, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to fuel a fuel cell at a second pressure and temperature.

Most hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

$$H_2 \rightarrow 2H^+ + 2e^-$$

Half-reaction at the cathode of the fuel cell:

$$2(2H^+ + 2e^-) + O_2 \rightarrow 2H_2O$$

Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

DMFCs are discussed in U.S. Pat. Nos. 4,390,603 and 4,828,941, which are incorporated by reference herein in their entireties.

In a chemical metal hydride fuel cell, sodium borohydride is reformed and reacts as follows:

$$NaBH_4 + 2H_2O \rightarrow (\text{heat and/or catalyst}) \rightarrow 4(H_2) + (NaBO_2)$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product, illustrated above. Sodium borate ($NaBO_2$) by-product is also produced by the reforming process. A sodium borohydride fuel cell is discussed in U.S. Pat. No. 4,261,956, which is incorporated by reference herein in its entirety.

As noted above, the products/byproducts of the fuel cell reactions include gasses such as hydrogen and carbon dioxide which may increase the internal pressure within the devices in which they are stored or generated. Additionally, as fuel is consumed in the fuel cell system a vacuum may be generated impairing the further flow of fuel from fuel supplies and/or cartridges to the fuel cell. Thus, various relief valves are known in the art for relieving these issues. However, these valves often involve numerous parts (springs, o-rings, elastomers, etc.) and a concern still remains regarding the reliability as well as the economics of these valves given that components such as fuel cartridges and supplies may be disposable. To a certain extent, this need for improved relief valves for fuel cell systems has been addressed by commonly owned, co-pending U.S. published application nos. 2007/0114485 [BIC-017.D1] as well as parent U.S. patent application Ser. No. 12/674,205 [BIC-112], which are incorporated herein by reference in their entireties. Nonetheless, there still exists the need for reliable relief valves and valves that can vent pressurized systems and can allow relief from a vacuum.

SUMMARY OF THE INVENTION

The inventive vent valve for a container of the current invention has a valve body and a sealing member with a peripheral portion and an internal position. One of the peripheral portion and internal position of the sealing member is secured to a first portion of the interior of the valve body, and the other portion of the sealing member forms a seal with a second portion of the interior of the valve body. The seal then opens and generates a flow path or vents when a threshold pressure inside the container is exceeded. In a further embodiment of the valve, the seal closes after establishing the flow path when the threshold pressure is not exceeded.

In another embodiment of the vent valve, the valve body comprises a first cap with at least one vent hole, and a center post. The center post may be integral to the first cap. The valve body of the vent valve may also have a second cap with at least one vent hole, and this second cap may be integral to the valve housing. Alternately, the center post may be integral to this second cap. Additionally, the center post of the vent valve may have a first and second piece in further embodiments of the invention. In such embodiments, the first center post piece may be integral to the first cap and/or the second center post piece may be integral to the second cap.

In another embodiment of the vent valve, the first part of the interior of the valve body is the cap or the valve housing. Additionally, the second part of the interior of the valve body is the center post. Alternatively, the first part of the interior of the valve body is the center post, and the second portion of the valve body is the cap or the valve housing.

Further, in one embodiment of the vent valve, the sealing member is a washer having an interior opening with an interior diameter. This washer may be a lip washer. In either case, the threshold pressure is about ±0.5 psi of an initial internal pressure of the container, and preferably the threshold pressure is about ±5 psi of the initial internal pressure of the container. Also, in certain embodiments, the sealing member has a durometer of about 30 to about 90 on Shore A durometer. The portion of the sealing member that forms the seal is the inner portion in certain embodiments.

In yet another embodiment, the vent valve is a two-way valve. The sealing member of the two-way vent valve may be tapered to the portion of the sealing member that forms a seal. The sealing member may also be supported to improve its strength or to provide the sealing member with multiple zones of elasticity or flexibility.

Additionally, in certain embodiments the valve housing of the valve body may be integral to a container for a fuel cell device.

BRIEF DESCRIPTION OF THE DRAWINGS

In the accompanying drawings, which form a part of the specification and are to be read in conjunction therewith and in which like reference numerals are used to indicate like parts in the various views:

FIGS. 1 *a-c* are cross-sectional views of a fuel supply valve of the parent '205 application and FIG. 1*d* is an exploded perspective view of the valve; and FIG. 2*a* is an exploded cross-sectional view of another exemplary fuel valve of the parent '205 application, and FIG. 2*b* is an exploded view of the valve.

DETAILED DESCRIPTION OF THE INVENTION

Figure 3A:
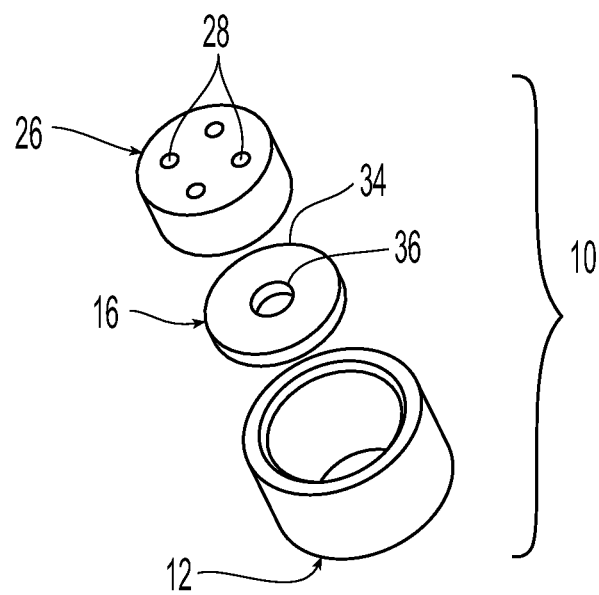
FIG. 3*a* is an exploded cross-sectional view of an exemplary relief valve of the current invention.

As illustrated in the accompanying drawings and discussed in detail below, the present invention is directed to relief valves or vent valves useable with a container, most preferably any fuel supplies or fluid storage devices including fuel cell fuel storage devices, (e.g., a fuel cell, refilling device, fuel cell fuel supply, hydrogen/gas generator or any other device suitable for use in a fuel cell system), to relieve a pressure differential within the container, i.e., internal pressure due to the build-up of gasses, vapors, and/or liquids, and/or a vacuum due to the withdrawal of fluids, such as fuels, and/or gasses from the device.

As used herein, the term "fuel supply" includes, but is not limited to, disposable cartridges, refillable/reusable cartridges, cartridges that reside inside the electronic device, removable cartridges, cartridges that are outside of the electronic device, fuel tanks, fuel refilling tanks, other containers that store fuel and the tubing connected to the fuel tanks and containers, and may include one or more inner liners. While a fuel supply is described below in conjunction with the exemplary embodiments of the present invention, it is noted that these embodiments are also applicable to other fuel supplies and the present invention is not limited to any particular type of fuel supply. The relief valves of the present application can be used with any supply or container of solid(s), liquid(s), and/or gas(es), where the internal pressure of such supply or container should be controlled.

In each instance of the above-noted fuel supplies, the fuel supply or container may be subjected to pressure differentials, i.e., the differences between ambient pressure and the pressure within the supply or container. The fuel supply may be under increasing internal pressure due to the vaporization or expansion of the fuel in response to environmental factors, such as temperature or pressure, or gaseous or liquid byproducts may accumulate within the fuel supply. If not relieved these pressures may lead to the structural failure of the fuel supply or container. Similarly, a vacuum may build within the supply or container as fuel is removed from the closed container. The vacuum or the collapse of an internal flexible bladder due to the vacuum will eventually prevent fuel from being supplied to the attached fuel cell which may trap fuel within the fuel supply.

FIGS. 1*a-d* and 2*a-b* illustrate non-interchangeable connecting fuel valves for a fuel cartridge disclosed in FIGS. 14*a-d* and 15*a-d*, respectively of parent U.S. patent application Ser. No. 12/674,205. As shown in FIG. 1*a*, the fuel transport valve 10 of the '205 application has a valve body 12 with a center post 14, a non-flat washer, or lip washer 16, that provides a seal with the center post 14, and a retainer 18 that holds washer 16 in place and is spaced away from center post 14 to form open channel 20. As discussed in the parent '205 application and shown in FIGS. 1*b* and 1*c*, a matched tube 22 is pushed into the valve 10 through channel 20 through retainer 18 and washer 16 breaking the seal between washer 16 and center post 14 establishing a flow path 23 between center post 14 and match tube 22 for the fuel to flow. Washer 16 in this configuration forms a seal with the outside surface of tube 22 to prevent flow of fuel outside of tube 22.

In the parent '205 application, valve 10 is used as a fuel transport valve when tube 22, which matches open channel 20, is inserted into channel 20 to allow fuel to be transported along fuel path 23. Another use for valve 10 without tube 22 is as a relief valve or vent valve, for a fuel supply 24, which is shown partially in FIG. 1a. As oriented in FIG. 1a, when internal pressure $P_{24}$ of fuel supply 24 drops below a vacuum threshold, washer 16 bends downward or inward to allow gas from the atmosphere to enter fuel supply 24. When oriented in the opposite direction, i.e., upside down, to FIG. 1a and with adequate clearance from retainer 18, valve 10 is a relief valve that can vent pressurized fluid when pressure $P_{24}$ exceeds a threshold pressure.

The fuel transport valve 10 in FIGS. 2a-2b is similar to valve 10 described in FIGS. 1a-1d except that washer 16 has a substantially flat configuration. This embodiment of valve 10 can also function as a relief valve without tube 22 as described above.

Referring to FIGS. 3a and b, another embodiment of relief valve 10 of the current invention is depicted. Valve 10 has a valve body made up of valve body 12, washer 16 and cap 26. Cap 26 comprises retainer 18 and center post 14 made integral to each other with vent hole(s) 28 formed thereon. Washer 16 forms a seal with center post 14. A principal difference between the embodiment shown in FIGS. 3a-3c, as well as the embodiments shown in FIGS. 4a-4c, FIGS. 5a-5b, FIGS. 6a-6c and FIGS. 7a-7c discussed below, and the embodiments shown in FIGS. 1a-1d and 2a-2b is that the embodiments shown in FIGS. 3a-3c, 4a-4c, 5a-5b, 6a-6c, and 7a-7e illustrate relief valves that can open and close in two directions, i.e., sealing members 16 within these relief valves can open in one direction, e.g., arrow A, to vent pressurized fluid or opposite direction, e.g., arrow B, to allow atmospheric gas to enter the supply or container to break a vacuum. This capability is provided by having space 30 disposed above sealing member 16 and space 32 disposed below sealing member 16 to allow sealing member 16 to flex in two opposite directions.

Figure 3B:
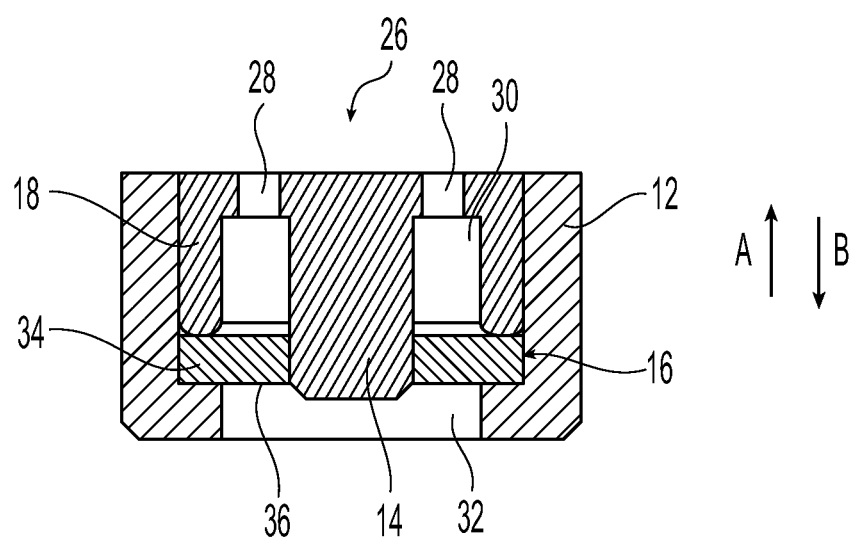
FIG. 3*b* is a cross sectional view of the valve.
Figure 7A:
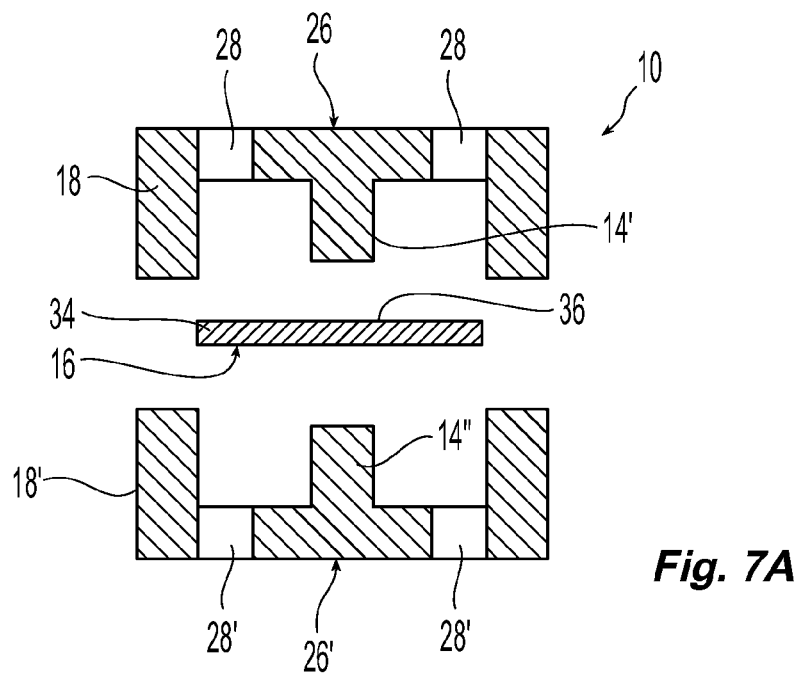
FIGS. 7*a-e* are cross-sectional views of another embodiment of the relief valve of the current invention where the sealing member is attached to the center post.
Figure 7B:
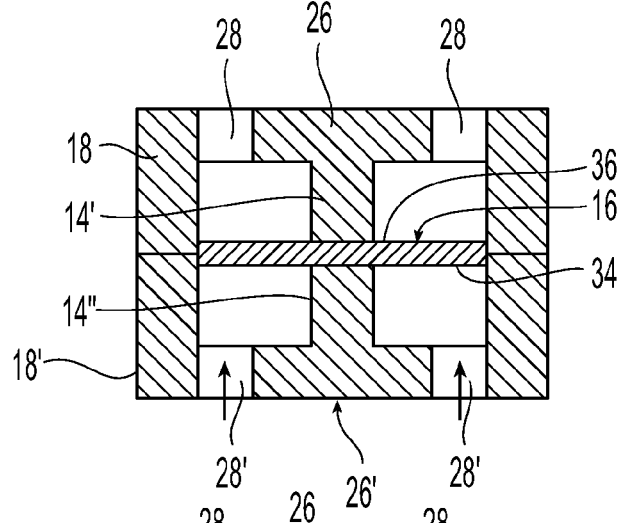
Figure 7C:
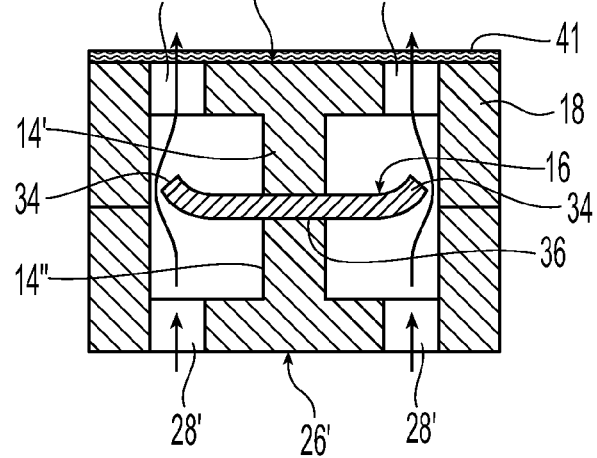

Sealing member or washer 16 has a peripheral portion 34 and an internal portion 36. Both portions can be utilized as the sealing surface. In the embodiments depicted in FIGS. 1a-1d through 6a-6c, peripheral portion 34 is secured to the valve body by retainer 18 and internal portion 36 forms an interference fit in center post 14 to form a seal, as best shown in FIG. 3(b). Alternatively, FIGS. 7a-e depict a further embodiment in which internal portion 36 of sealing member 16 is secured to or is retained by center post 14 and peripheral portion 34 forms an interference fit with the interior of the valve body to form a seal. Relief valve 10 of this alternative embodiment has first cap 26 with retainer 18 and a first part of center post 14' integrally incorporated and vent hole(s) 28 therein, a second cap 26' with valve housing 12 and second part of center post 14" integrally incorporated and vent hole(s) 28' therein, and sealing member 16. As shown in FIG. 7b, sealing member 16 is retained between first center post 14' and second center post 14". Peripheral portion 34 of sealing member 16 forms a seal with retainer 18 and can move up or down to vent the fuel supply. In this embodiment, sealing member 16 may be a washer similar to the other embodiments, or it can be a circular disk, as shown in FIGS. 7a-7c. Also, in this embodiment, center posts 14' and 14" act as the retainer mechanism.

Figure 4A:
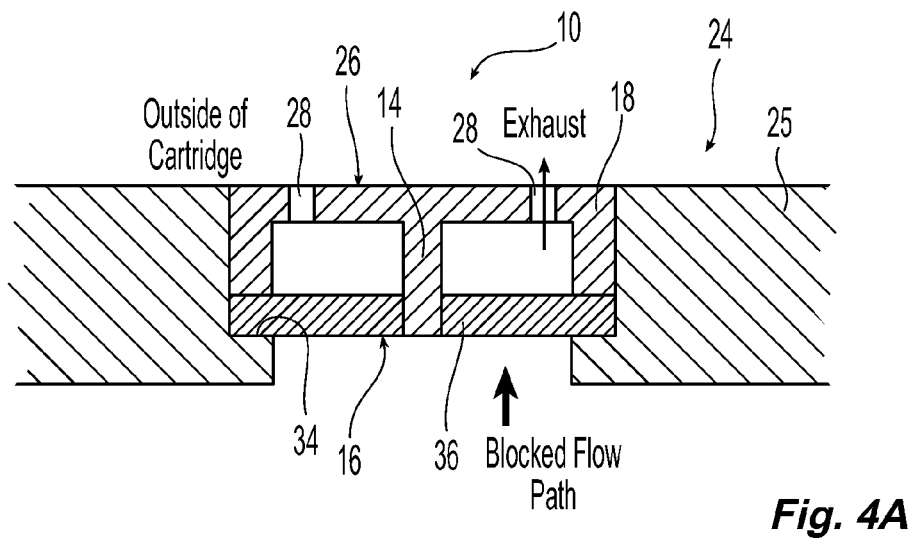
FIGS. 4*a-c* are cross-sectional views of a relief valve of the current invention illustrating how the valve operates.
Figure 4B:
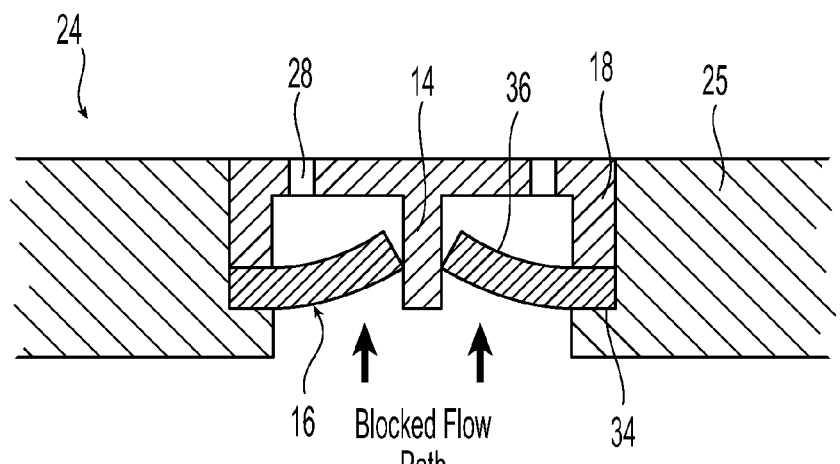
Figure 4C:
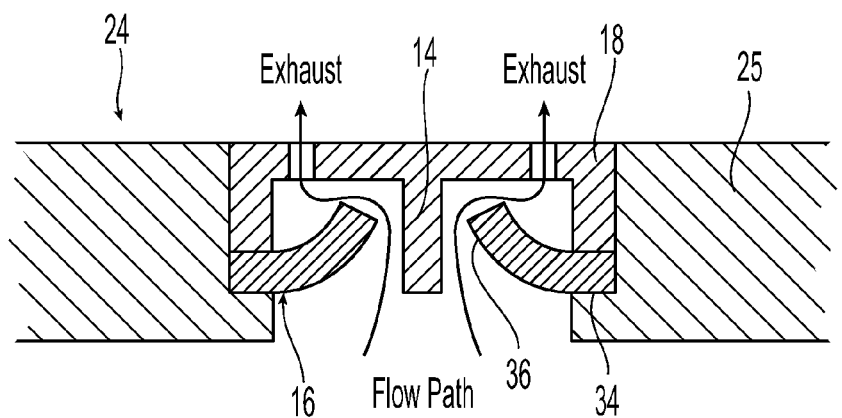
Figure 5A:
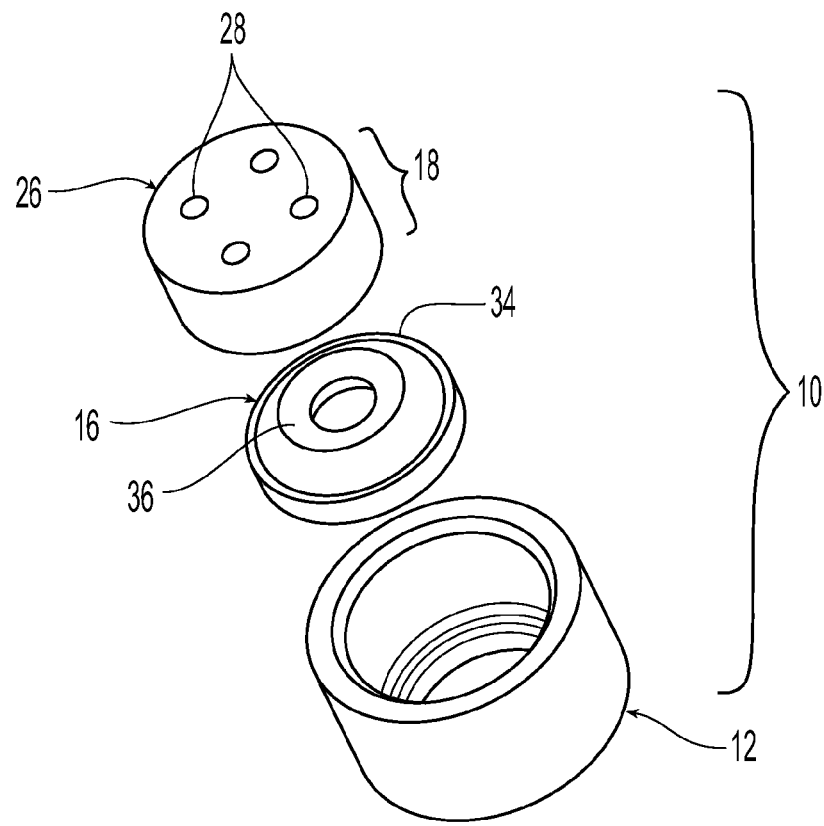
FIG. 5*a* is an exploded cross-sectional view of a variation of the valve of FIG. 3*a*.
Figure 5B:
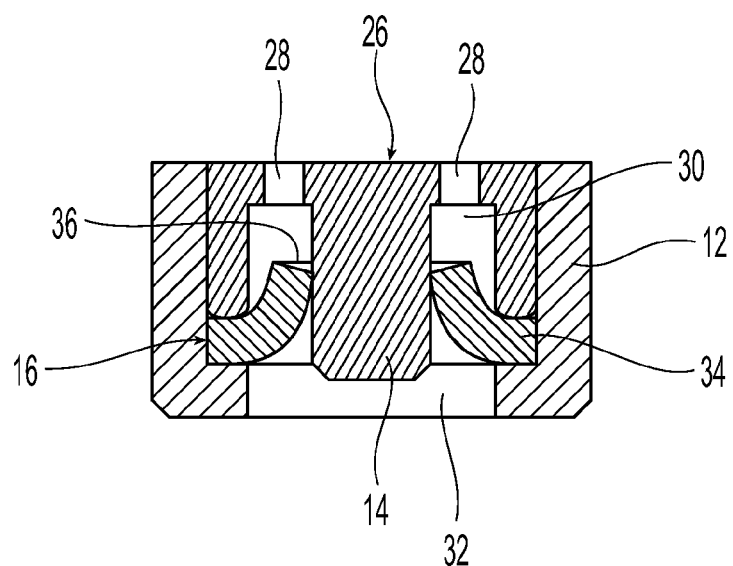
FIG. 5*b* is a cross-sectional view of the valve.
Figure 6A:
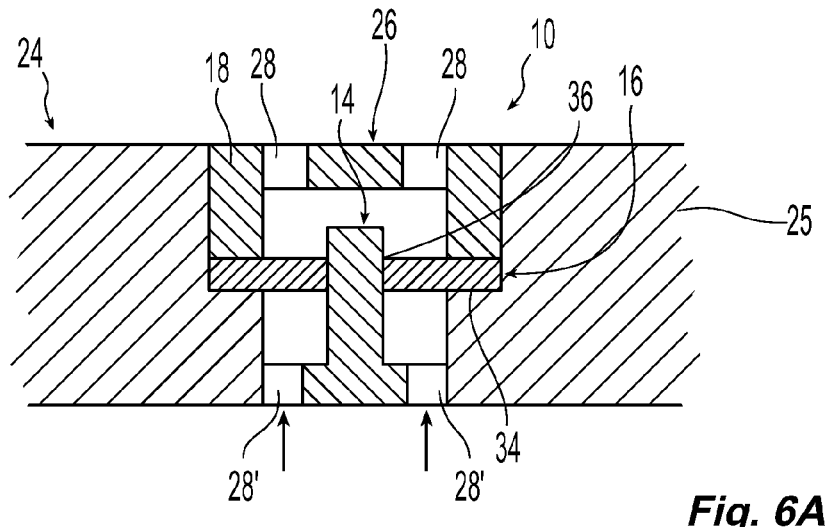
FIGS. 6*a-c* are cross-sectional views of a variation of the relief valve of the current invention illustrating how the valve operates.
Figure 6B:
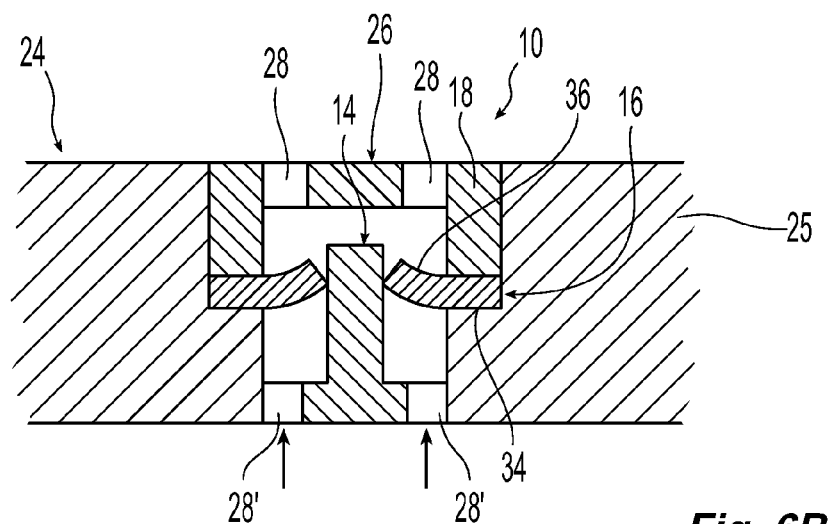
Figure 6C:
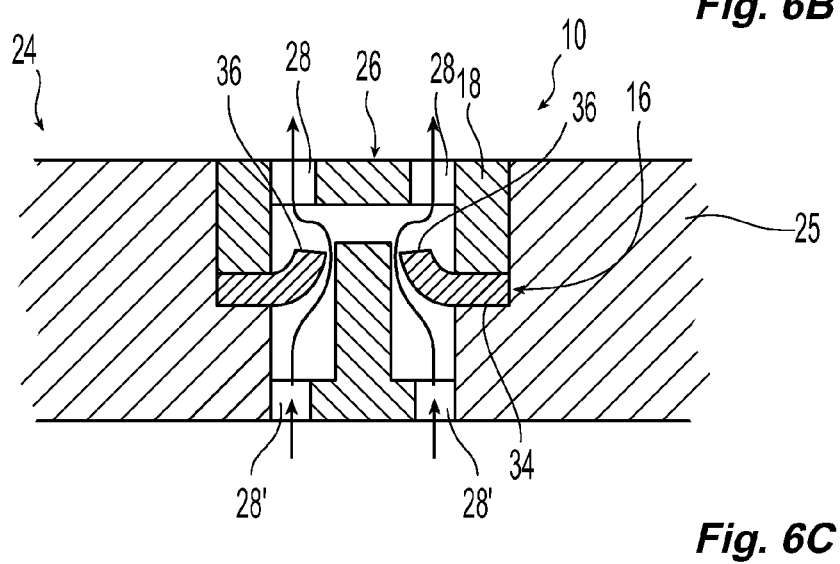

The embodiment of FIGS. 4a-4c is similar to that of FIGS. 3a-3b, except that valve body 12 has been incorporated into outer casing 25 of fuel supply 24 and peripheral portion 34 of sealing member 16 is retained between retainer 18 of cap 26 and outer casing 25 of fuel supply 24. The embodiment of FIGS. 5a-5b is similar to that of FIGS. 3a-3b, except that sealing member 16 is a non-flat washer or more specifically a conical washer or lip washer. In the embodiment shown in FIGS. 6a-6c, center post 14 is separated from cap 26 and is attached to outer casing 25 of fuel supply 24.

Figure 7D:
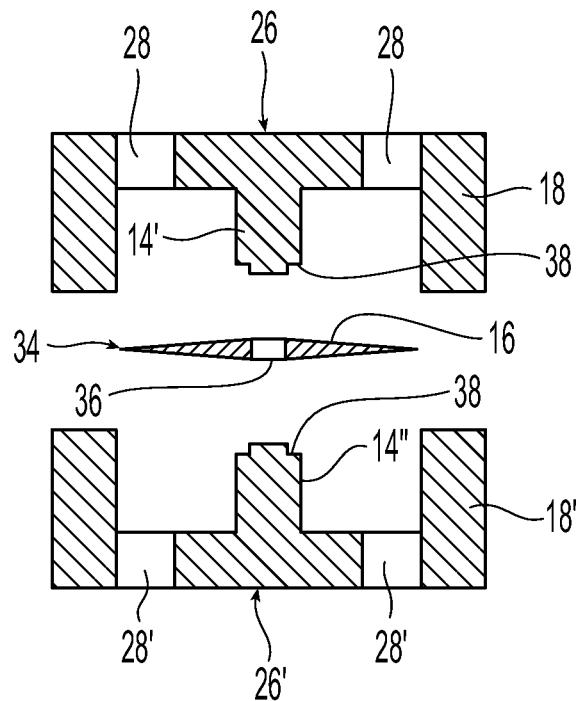
Figure 7E:
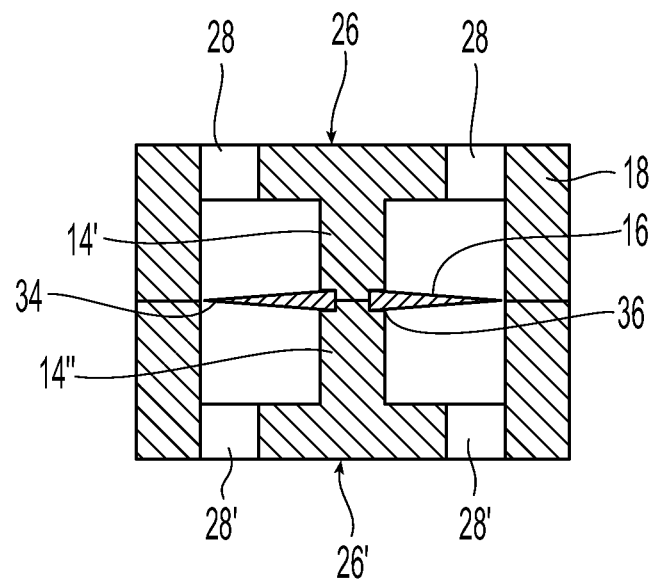

In accordance with another aspect of the present invention, the seal or interference fit between either peripheral portion 34 and retainer 18 or between internal portion 36 and center post 14 may have a sharp or pointed profile, e.g., a wiper edge, as shown in FIGS. 7d-7e, instead of a square profile. The pointed profile is more flexible than the square profile and can be used to control the opening and closing threshold pressure of relief valve 10. Also shown in FIGS. 7d and 7e, valve 10 may comprise two caps 26, 26' which are substantially similar to each other. Caps 26 and 26' may secure there between a sealing member or washer 16 and more specifically secure washer 16 at ledges 38 on center posts 14' and 14".

Referring again to FIGS. 4a-c and 6a-6c, the operation of relief valve 10 to relieve high internal pressure within fuel supply 24 is described. Initially, as shown in FIG. 4a, the internal pressure $P_{24}$ of the fuel supply 24 is within ±x psi, e.g., ±2 psi or ±5 psi, of ambient pressure and sealing member 16 remains flat with its inner portion 34 pressed against the outer diameter of center post 14 to seal relief valve 10. As pressure difference builds within the fuel supply toward x psi, inner portion 36 of sealing member 16 is deflected upwards but still maintains contact with center post 14 along a lip of inner portion 36 to maintain the seal, as best shown in FIG. 4b. As shown in FIG. 4c, when the pressure difference, within fuel supply 24 surpasses the threshold x psi of pressure $P_{24}$, inner portion 36 of sealing member 16 is deflected off of center post 14 such that a flow path is established to exhaust the gas and/or liquid and relieve the excess pressure within fuel supply 24. When the pressure in fuel supply 24 is relieved inner portion 36 of sealing member 16 will come into contact with center post 14 again thereby closing relief valve 10. Similarly, when a vacuum occurs within fuel supply 24, inner portion 36 of sealing member 16 in contact with center post 14 will be deflected downward away from center post 14 and a lip of inner portion 36 will remain in contact with center post 14. Eventually, the pull of the vacuum reaches threshold −x psi of pressure $P_{24}$ and the lip is deflected off of center post 14 creating a flow path which permits air or other gases to enter vessel alleviating the vacuum. The valve closes once the vacuum is relieved and the edge of sealing member 16 comes into contact with central post 14 once again. FIGS. 7b-7c demonstrate a similar operation of relief valve 10 when the interference fit or seal occurs between peripheral portion 34 of sealing member 16 and the valve body/retainer body.

The relief valve of the current invention offers numerous advantages over those of the prior art. Namely, the compact novel three-part design (cap 26, valve housing 12 or second cap 26', and sealing member 16) provides increased reliability in that the valve lacks moving parts, and other components which may be subject to failure. Further, the innovative design provides economic advantages by reducing the costs of fabricating the valve components and assembling the components, and providing an assembly method that is well suited to automation. These advantages make the relief valve ideal for usage in fuel cell systems and in particular those devices/components of the system that are disposable or may be discarded, such as fuel supplies, cartridges, and or refilling devices.

Vent hole(s) 28 may consist of any opening that permits the efficient flow of gasses including, but not limited to, holes, perforations, slots, or vents. Preferably, vent hole(s) 28 are sized and/or oriented so as to prevent the unintended or unauthorized opening of release vent 10. For example, vent hole(s) 28 may be shaped and sized to prevent the use of common implements such as pen points, paper clips, pins, knives, etc. to open relief valve 10. Further, vent hole(s) 28 may be oriented at an angle (preferably about 0-60° or about 120-180°) to first cover 26 as opposed to perpendicular to first cover 26 to deflect foreign objects away from sealing member 16 thereby preventing the unintended opening of the relief valve. A second cover 26' may also be present, as depicted in FIGS. 6a-c and 7a-e. This second cover 26', which may or may not be integral to valve housing 12, has vent hole(s) 28' as well to permit the efficient passage of gasses and may be sized and/or oriented to prevent unintended access to the interior of the device as disclosed above. In a further effort to prevent unintended access, vent hole(s) 28 and 28' may be offset or angularly offset so as to prevent a foreign object from passing through both sets of vent holes. Additionally, second cover 26' may optionally have a filter on its face or its interior, to the extent that such filter will not interfere with operation of the valve, to prevent the intake or the release of unintended liquids or gasses through the vent.

Center post 14 as shown herein is cylindrical, however, center post 14 may adopt other shapes so long as the shapes remain consistent with the purpose of either securing or forming an interference fit with sealing member 16. When the interference fit is between center post 14 and internal portion 36 of sealing member 16, center post 14 should be of sufficient length to prevent internal portion 36 of sealing member 16 from extending beyond center post 14 when the seal opens. Center post 14 should be of sufficient length to extend through a substantial portion of valve housing 12, and preferably extends entirely through valve housing 12. Center post 14 is positioned such that it does not move relative to first cap 26, second cap 26', retainer 18 and/or valve housing 12.

First cap 26, valve housing 12, and center post 14 may be made of any material typically used in the manufacture of valves and containers for devices associated with a fuel cell system, preferably the materials are compatible with fluids and gasses utilized (fuels, products and byproducts) within the fuel cell system.

Sealing member 16 of the current invention may be made of elastomeric materials, those materials exhibiting viscoelastic properties (having a low Young's modulus and a high yield strain). Suitable elastomeric materials may include, and are not limited to, saturated rubbers such as natural, synthetic poly isoprene, butyl, halogenated butyl, polybutadiene, styrene-butadiene, nitrile, hydrogenated nitrile, and chloroprene rubbers; unsaturated rubbers such as ethylene propylene, ethylene propylene diene, epichlorohydrin, polyacrylic, silicone, fluorosilicone, fluoroelastomers, perfluoroelastomers, polyether block amines, chlorosulfonated polyethylene, and ethylene vinyl acetate rubbers; and elastomers such as thermoplastic elastomers (styrenic block, polyolefin blends, elastomeric alloys, thermoplastic copolyester, thermoplastic polyamides), thermoplastic vulcanizates, thermoplastic polyurethanes, thermoplastic olefins, and polysulfide rubber. Preferably, the elastomeric material selected is compatible with the gasses, vapors, and/or liquids that may be exhausted from the device of the fuel cell system, and more preferably is compatible with all of the fuels, reaction products, and/or reaction byproducts of the fuel cell system so as to avoid corrosion of the valve over time due to vapors or liquids containing these components. Most preferably the elastomeric material is ethylene propylene diene monomer rubber such as those obtained from McMaster-Carr (Santa Fe Springs, Calif.).

Various parameters of the elastomeric material may also be used to assure that sealing member 16 deflects once the threshold pressure is exceeded. Flexural modulus, durometer, tensile strength, compression set, heat resistance, fluid resistance, low temperature resistance and tear strength are some of the attributes that will influence the sealing member's ability to deflect when the threshold pressure is exceeded. The elastomeric material of the sealing member 16 may have a Shore A durometer (ASTM D2240) of about 30 to 90 (medium soft to medium hard), and more preferably about 40 to 70. Similarly, the heat and low temperature resistance of the elastomeric material of the sealing member 16 should be acceptable for the intended and or actual operating conditions of the fuel supply and/or fuel cell device. Additionally, the elastomeric materials used for sealing member 16 should be able to withstand pressures of 30-40 psi and in certain instances may be able to withstand pressures of greater than 100 psi. Additionally, variables such as the coefficient of friction between sealing member 16 and the second portion of the interior of the valve body, thickness of sealing member 16, etc. may further permit the valve to be calibrated to a desired threshold pressure.

Further, in their neutral orientation the portion of sealing member 16 of the relief valves of the current invention that forms the interference fit lies flat against the second portion of the interior of the valve body. Alternatively, the valve may be biased in one direction, either exhaust or intake, by using a lip washer or sheet where the edge of the elastomeric member is oriented in the preferred direction. FIGS. 5a-b depict a relief valve of the current invention where a conical or lip washer is used to bias the valve in the exhaust direction, i.e., the edge of the washer forming the interference fit is oriented towards the cap. Preferably, the relief valves of the current invention are bi-directional, allowing for the exhaust of gasses and intake of air. In addition to the relief valves depicted, the bi-directional valve may be accomplished by a low interference fit between sealing member 16 and second portion of the interior of the valve body, and/or rounding the edges of the portion of sealing member 16 that forms the interference fit with second portion of the interior of the valve body.

The threshold pressure at which the valve opens should be sufficient that the valve opens prior to damage or structural failure occurring to the fuel supply and or fuel cell device and/or prior to a vacuum interfering with the flow of fuel from the fuel supply or through the fuel cell device. Preferably, the threshold pressure at which the valve opens should be about ±0.5 psi, ±1 psi, ±2 psi or ±5 psi of the initial internal pressure $P_{24}$ of the fuel supply 24. The initial internal pressure $P_{24}$ of the fuel supply 24 is the pressure within the container when it is initially charged with the solid(s), gas(es), and/or liquid(s). As noted above, the initial internal pressure $P_{24}$ of the fuel supply 24 may be ambient pressure or within ±2 psi or ±5 psi of ambient pressure. When the valve is bidirectional the positive and negative threshold pressures for the valve need not be the same. For example the valve may have a −0.5 psi threshold and +5 psi threshold such that the valve will open in response to a vacuum sooner than it will to overpressure.

Additionally, relief valve 10 may comprise a liquid absorbing member 41, such as paper, textiles or other fibrous materials, that can absorb any liquid that may accompany the released gas. The liquid absorbing member can be place on top of cap 26 as best shown in FIG. 7c or inside cap 26 around center post 14. The liquid absorbing member can be either acidic or basic to neutralize the liquid. In one example, if the liquid is basic, then the liquid absorbing member should be acidic.

Figure 8A:
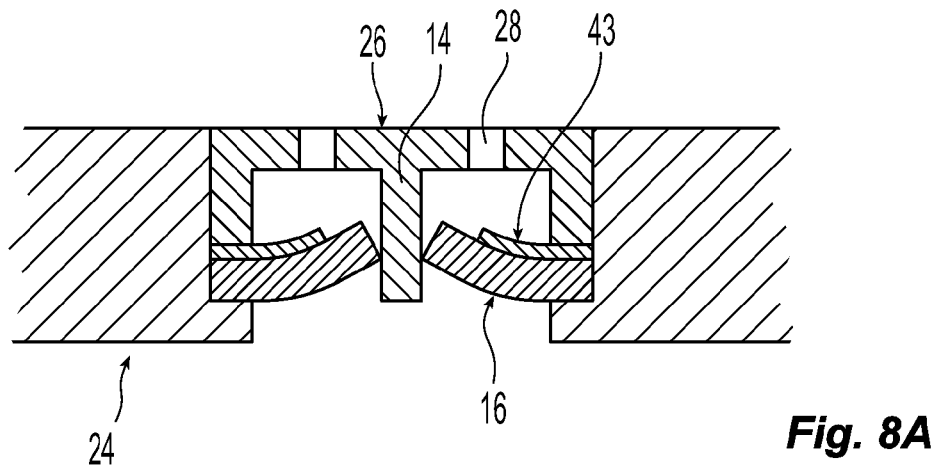
FIGS. 8*a-e* are cross-sectional views of another embodiment where the sealing member is reinforced.
Figure 8B:
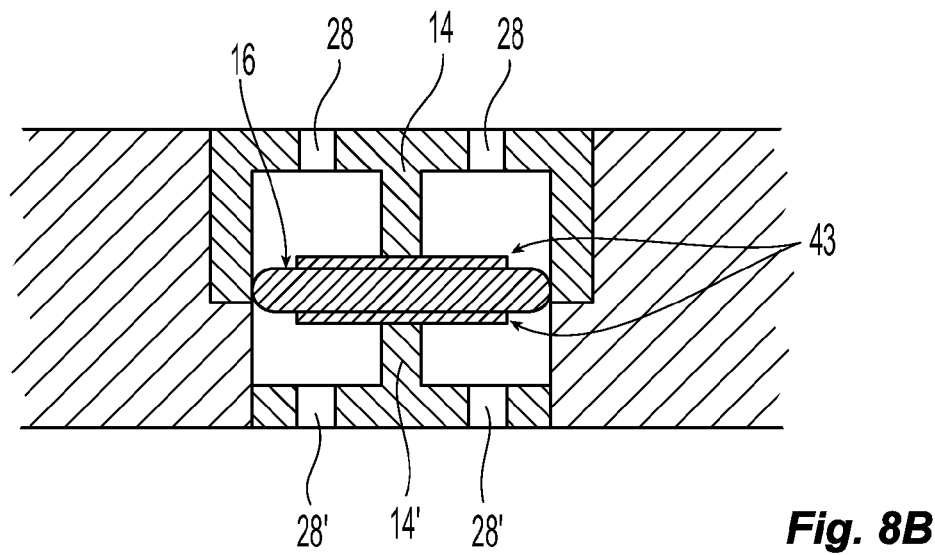

In another embodiment, sealing member 16 may be provided with a reinforcing member such as washer or disk 43 shown in FIGS. 8a and 8b. Preferably, reinforcing member 43 only partially overlaps sealing member 16, as shown. Reinforcing member 43 may be positioned above or below sealing member 16 and can be positioned both above and below sealing member 16 to support uni-directional or bi-directional venting. When two reinforcing members 43 are used, they may have different flexibilities. A single reinforcing member 43 may also have non-uniform flexibility. Preferably, reinforcing member 43 does not form a seal with center post 14 as shown in FIG. 8a or with retainer 18 as shown in FIG. 8b, but limits the amount of flexing that sealing member 16 would undergo. This can extend the life of sealing member 16 and allows valve 10 of the present invention to withstand a higher internal vacuum or pressure $P_{24}$. Reinforcing member 43 may be made from an elastomer, a thermoplastic or thermoset or metal. Reinforcing member 43 may be molded on to sealing member 16 and be integral thereto.

Reinforcing member 43 may flex along with sealing member 16 or may remain substantially rigid. The portion of sealing member 16 supported by reinforcing member 43 has a higher rigidity or lower flexibility than the portion of sealing member 16 that is unsupported by or overhangs reinforcing member 43 has a lower rigidity or higher flexibility. This provides sealing member with multiple zones of flexibilities and allows the designers with multiple degrees of freedom in designing vent valve 10 or the fuel transport valve 10 described in the parent '205 application.

Figure 8C:
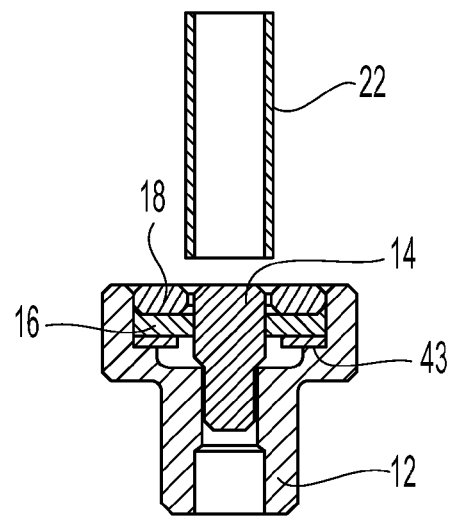
Figure 8D:
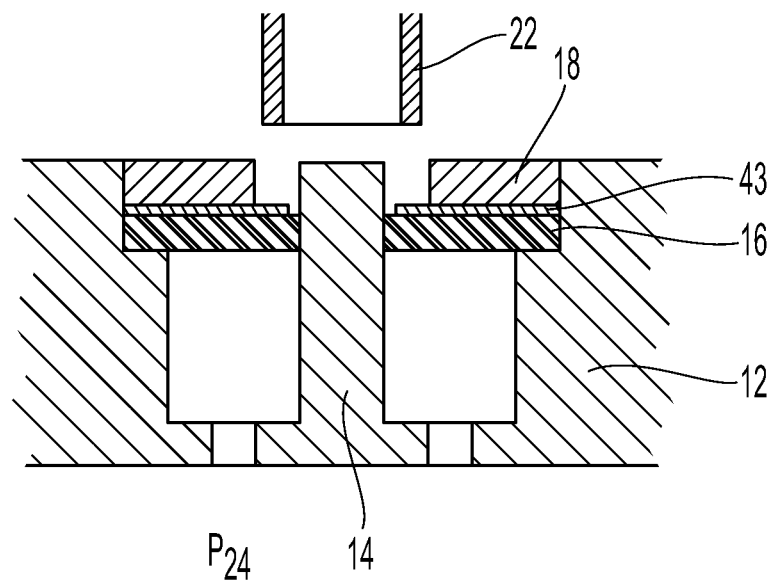
Figure 8E:
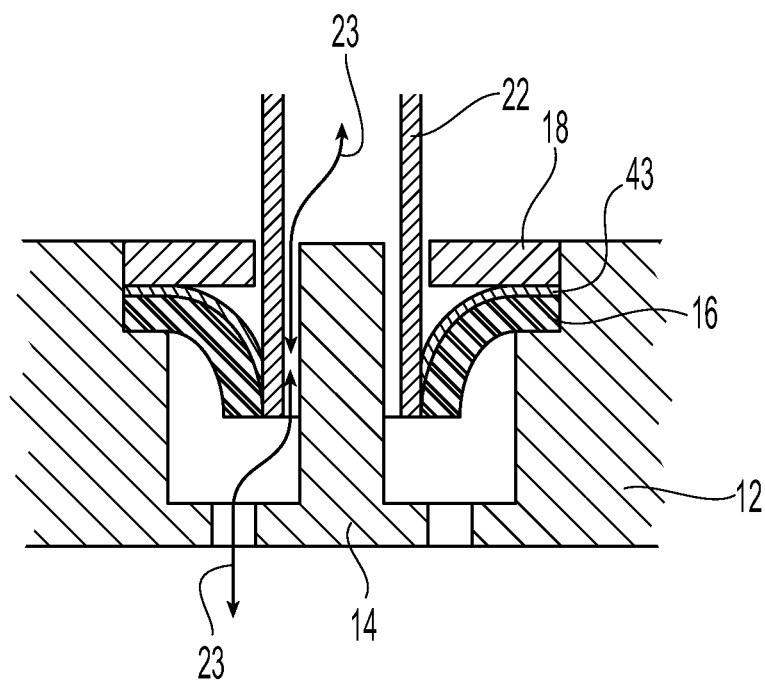

Referring to FIGS. 8c-e, reinforcing member 43 can also be used with the fuel transport valve 10 of the parent '205 application. FIG. 8c is similar to FIG. 2a, except that reinforcing member 43 is positioned below sealing member 18 to support sealing member 16 as tube 22 is inserted in the valve to establish fuel flow path 23. Reinforcing member 43 can also be positioned above sealing member 16 or between retainer 18 and sealing member 16, as shown in FIGS. 8d-e. In this configuration, tube 22 interacts or reinforcing member 43 and pushes it and sealing member 16 downward to open fuel flow path 23. Advantages of the configuration of FIGS. 8d-e include but are not limited to the facts that valve 10 can withstand higher internal pressure $P_{24}$ when valve 10 is in the shut-off position, and that reinforcing member 43 protects sealing member 16 from damages caused by contact with tube 22 and/or foreign objects and debris.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. For example, the exemplary embodiments of the valve have been disclosed with respect to a fuel supply but it will be understood that the valve has utility within other devices in a fuel supply system such as a fuel cartridge, fuel cell, etc. Further, the utility of the above noted relief valves is not limited to fuel cell systems but may be adopted to other uses within the field including, but not limited to, food storage, manufacturing, and medical with the recognition that the components of the inventive relief valve be adapted to the field, i.e. the use of food grade plastics/elastomers within the field of food storage. Additionally, components or features of one embodiment can be utilized in other embodiments.

The invention claimed is:

1. A fuel supply for a fuel cell device, wherein the fuel supply comprises a vent valve having a valve housing disposed in an outer casing of the fuel supply, wherein the vent valve comprises:
   a valve body; and
   a sealing member with a peripheral portion and an internal part,
   wherein one of the peripheral portion and internal part of the sealing member is secured to a first portion of the interior of the valve body, and the other part forms a seal with a second portion of the interior of the valve body;
   wherein the valve housing disposed in the outer casing is flush with the outer casing of the fuel supply so an outer surface of the valve body and an outer surface of the outer casing form a substantially continuous plane;
   wherein the seal opens and generates a flow path when a threshold pressure inside the fuel supply is exceeded.

2. The fuel supply of claim 1, wherein the valve body comprises a center post and a first cap with at least one vent hole.

3. The fuel supply of claim 2, wherein the center post is integral to the first cap.

4. The fuel supply of claim 2, wherein the valve body is further comprised of a second cap with at least one vent hole.

5. The fuel supply of claim 4, wherein the second cap is integral to the valve housing.

6. The fuel supply of claim 5, wherein the center post is integral to the second cap.

7. The fuel supply of claim 2, wherein the center post is comprised of a first and a second piece.

8. The fuel supply of claim 1, wherein the first portion of the interior of the valve body is a cap or the valve housing.

9. The fuel supply of claim 8, wherein the second portion of the interior of the valve body is a center post.

10. The fuel supply of claim 1, wherein the first portion of the interior of the valve body is a center post.

11. The fuel supply of claim 10, wherein the second portion of the valve body is a cap or the valve housing.

12. The fuel supply of claim 1, wherein the sealing member is a washer having an interior opening with an interior diameter.

13. The fuel supply of claim 12, wherein the washer is a lip washer.

14. The fuel supply of claim 1, wherein the threshold pressure is about ±0.5 psi of an initial internal pressure of the fuel supply.

15. The fuel supply of claim 1, wherein the threshold pressure is about ±2 psi of the initial internal pressure of the fuel supply.

16. The fuel supply of claim 1, wherein the sealing member has a durometer of about 30 to about 90 on Shore A durometer.

17. The fuel supply of claim 1, wherein the portion of the sealing member that forms the seal is the inner portion.

18. The fuel supply of claim 1, wherein the valve is a two-way valve.

19. The fuel supply of claim 18, wherein the sealing member is tapered to portion of the sealing member that forms a seal.

20. The fuel supply of claim 1, wherein the seal closes after establishing the flow path when the threshold pressure is not exceeded.

21. The fuel supply of claim 1, further comprising a liquid absorbing member.

22. The fuel supply of claim 21, wherein the liquid absorbing member is acidic.

23. The fuel supply of claim 1 further comprising at least one reinforcing member supporting the sealing member.

24. The fuel supply of claim 23, wherein the reinforcing member is positioned adjacent to the sealing member.

25. The fuel supply of claim 23, wherein the fuel supply includes a fuel transport valve comprising the vent valve and a hollow member to be inserted into said vent valve to establish a fuel flow path through the fuel transport valve.

26. The fuel supply of claim 1 wherein the sealing member comprises a plurality of flexible zones.

27. A container comprising a fuel transport valve, wherein the fuel transport valve comprises:
   a valve body; and
   a sealing member with a peripheral portion and an internal part,
   at least one reinforcing member supporting the sealing member and positioned on at least one side thereof, wherein the at least one reinforcing member is a washer or a disk;
   wherein one of the peripheral portion and internal part of the sealing member is secured to a first portion of the interior of the valve body, and the other part forms a seal with a second portion of the interior of the valve body; and
   a hollow tubular member matched to push the sealing member to establish a fuel flow path through the hollow tubular member of the fuel transport valve.

28. A container comprising a vent valve, wherein the vent valve comprises:
   a valve body; and
   a planar sealing member with a peripheral portion and an internal part,
   wherein one of the peripheral portion and internal part of the planar sealing member is secured to a first portion of the interior of the valve body, and the other part is tapered and forms a seal with a second portion of the interior of the valve body;
   wherein the seal opens and generates a flow path to vent the container to the atmosphere when a threshold pressure inside the container is exceeded.

29. A container having a vent valve and a valve housing, wherein the vent valve is disposed in the valve housing and the vent valve comprises:
   a valve body;
   a liquid absorbing acidic member; and
   a sealing member with a peripheral portion and an internal part,
   wherein one of the peripheral portion and internal part of the sealing member is secured to a first portion of the interior of the valve body, and the other part forms a seal with a second portion of the interior of the valve body;
   wherein the seal opens and generates a flow path to vent the container to the atmosphere when a threshold pressure inside the container is exceeded.

30. The container of claim 29, wherein the liquid absorbing acidic member is planar.

* * * * *